(12) United States Patent
Chen et al.

(10) Patent No.: US 8,444,170 B2
(45) Date of Patent: May 21, 2013

(54) FOLDABLE STROLLER

(75) Inventors: Shun-Min Chen, Taipei (TW);
Jian-Qun Li, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 493 days.

(21) Appl. No.: 11/857,536

(22) Filed: Sep. 19, 2007

(65) Prior Publication Data

US 2008/0073879 A1    Mar. 27, 2008

(30) Foreign Application Priority Data

Sep. 21, 2006  (CN) .................. 2006 2 0136654 U
Jul. 31, 2007  (CN) .................. 2007 2 0157162 U

(51) Int. Cl.
*B62B 7/00* (2006.01)
*B62B 7/06* (2006.01)
*B62B 9/00* (2006.01)

(52) U.S. Cl.
USPC ................. 280/642; 280/647; 280/650

(58) Field of Classification Search .............. 280/642, 280/647, 650
See application file for complete search history.

(56) References Cited

U.S. PATENT DOCUMENTS

| | | | | |
|---|---|---|---|---|
| 4,191,397 A | * | 3/1980 | Kassai ................... | 280/647 |
| 4,412,688 A | * | 11/1983 | Giordani ................ | 280/642 |
| 4,544,178 A | * | 10/1985 | Al-Sheikh et al. ..... | 280/642 |
| 4,697,823 A | | 10/1987 | Kassai | |
| 4,805,737 A | * | 2/1989 | Peng ..................... | 182/163 |
| 4,824,278 A | * | 4/1989 | Chang ................... | 403/93 |
| 5,257,799 A | * | 11/1993 | Cone et al. ............ | 280/642 |
| 5,511,441 A | | 4/1996 | Arai | |
| 5,590,896 A | * | 1/1997 | Eichhorn ............... | 280/642 |
| 5,975,559 A | * | 11/1999 | Zonka ................... | 280/650 |
| 6,102,432 A | * | 8/2000 | Cheng ................... | 280/642 |
| 6,238,125 B1 | * | 5/2001 | Lin ....................... | 403/102 |
| 6,533,310 B2 | * | 3/2003 | O'Shea et al. ........ | 280/644 |
| 6,565,156 B1 | * | 5/2003 | Yamashita et al. ..... | 297/354.12 |

(Continued)

FOREIGN PATENT DOCUMENTS

| | | |
|---|---|---|
| GB | 1469770 A | 4/1977 |
| GB | 2069939 A | 9/1981 |
| GB | 2104850 A * | 3/1983 |
| GB | 2144684 A | 3/1985 |

OTHER PUBLICATIONS

Official Action for counterpart Application No. GB0718290.0 in Great Britain, Search Report under Section 17(5), Nov. 19, 2007, 4 pages.

*Primary Examiner* — J. Allen Shriver, II
*Assistant Examiner* — Chiedu Chibogu
(74) *Attorney, Agent, or Firm* — Sheridan Ross P.C.

(57) ABSTRACT

A foldable stroller includes a frame, a seat, and a plurality of wheels. The seat is disposed on the frame. The frame includes two back-frame side rod sections, two rear-leg side rod sections, and two rear-leg connecting members. Each of the back-frame side rod sections is connected pivotally to the corresponding rear-leg side rod section by the corresponding rear-leg connecting member. As such, the back-frame side rod sections are pivotable respectively toward the rear-leg side rod sections to fold the frame. The frame further includes two knuckles disposed respectively on bottom ends of the back-frame side rod sections, and two latch mechanisms disposed respectively on the knuckles. The latch mechanisms are operable to lock the frame in an unfolded or folded state.

6 Claims, 17 Drawing Sheets

U.S. PATENT DOCUMENTS

| | | | |
|---|---|---|---|
| 6,629,801 B2 * | 10/2003 | Cheng | 403/101 |
| 6,805,513 B2 * | 10/2004 | Marquina | 403/107 |
| 6,910,708 B2 * | 6/2005 | Sack et al. | 280/642 |
| 7,043,779 B2 * | 5/2006 | Mendenhall et al. | 5/99.1 |
| 7,070,197 B2 * | 7/2006 | Chen | 280/642 |
| 7,178,822 B2 * | 2/2007 | Chen | 280/642 |
| 7,632,035 B2 * | 12/2009 | Cheng | 403/98 |
| 7,871,099 B2 * | 1/2011 | Gilbertson et al. | 280/642 |
| 2002/0066156 A1 * | 6/2002 | Durrin | 16/47 |
| 2003/0052475 A1 | 3/2003 | Suga et al. | |
| 2004/0245748 A1 | 12/2004 | Wang | |
| 2007/0096434 A1 * | 5/2007 | Haeggberg | 280/642 |
| 2007/0228697 A1 * | 10/2007 | Miller et al. | 280/650 |

* cited by examiner

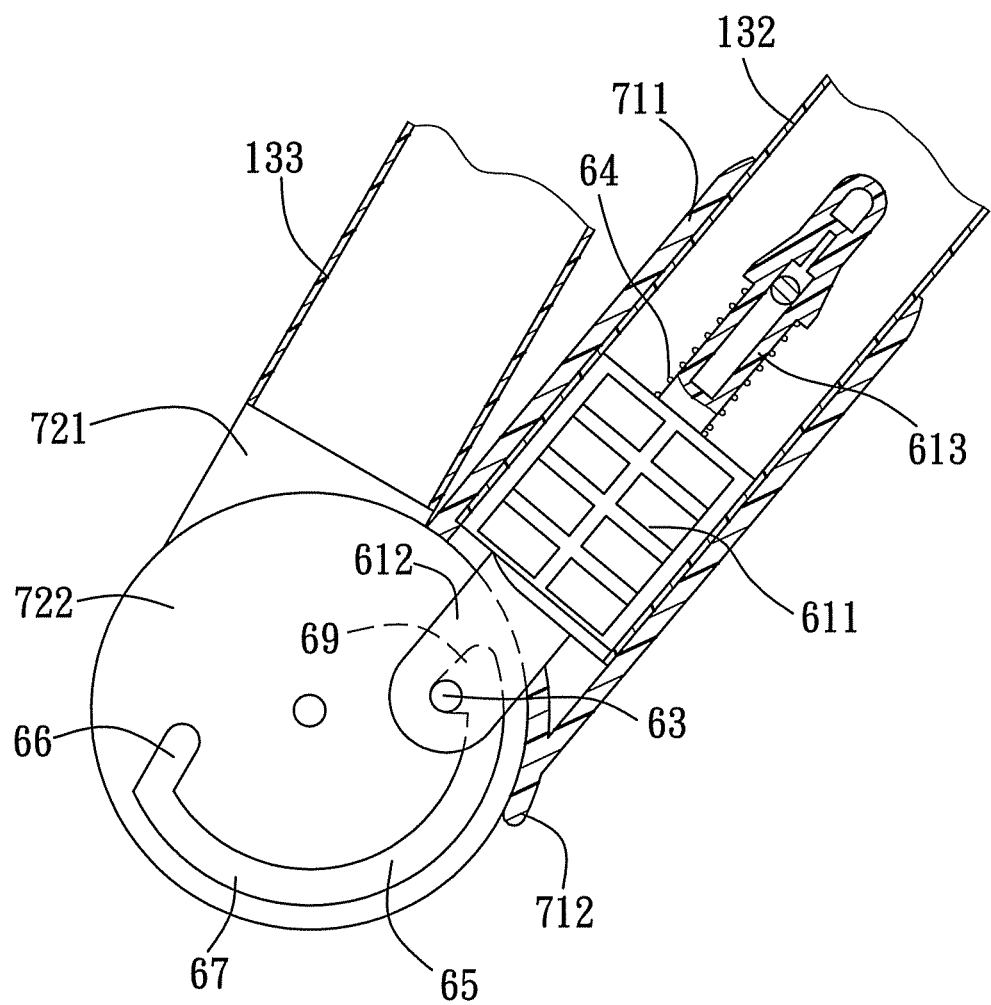
F I G. 9

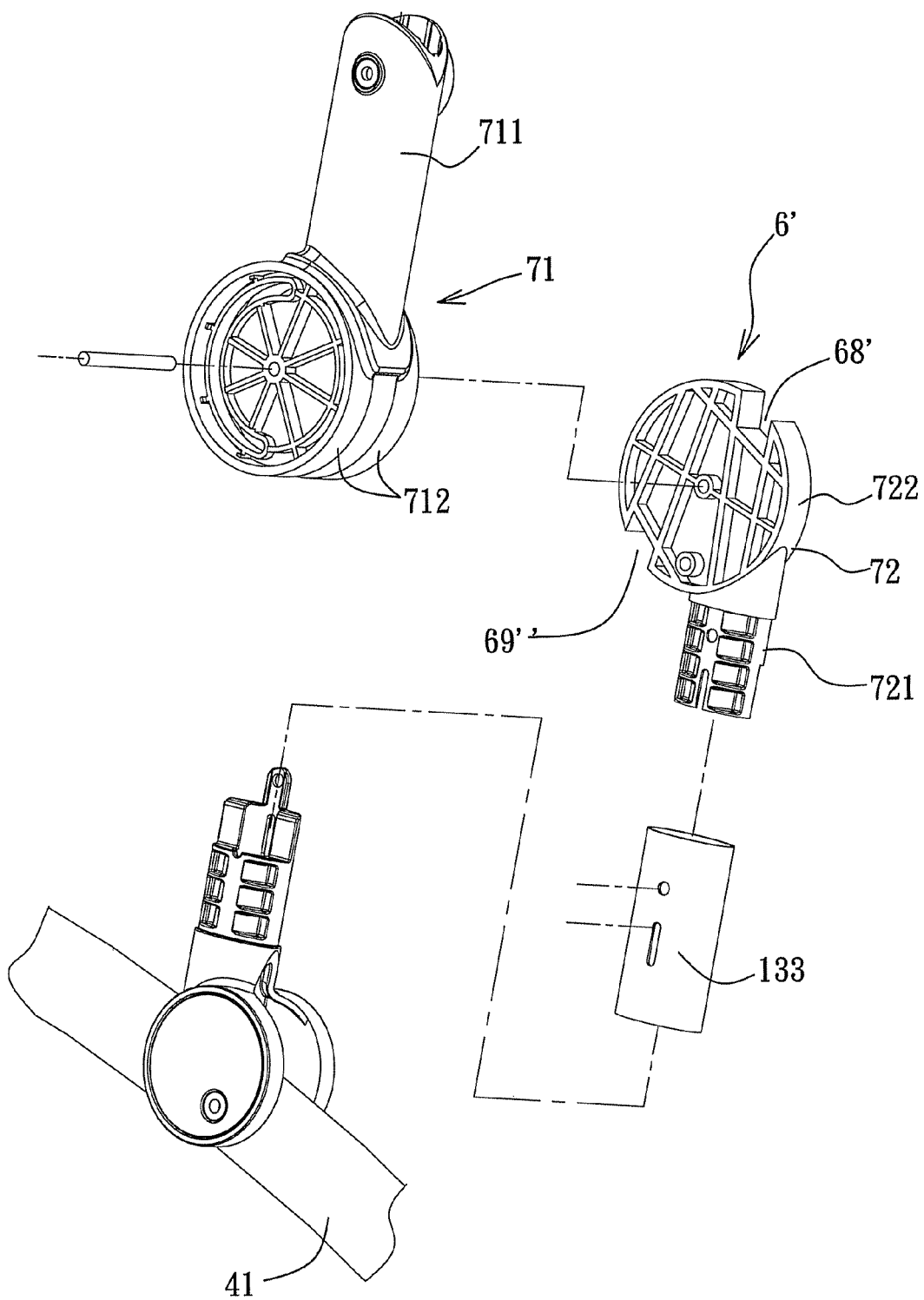
F I G. 10

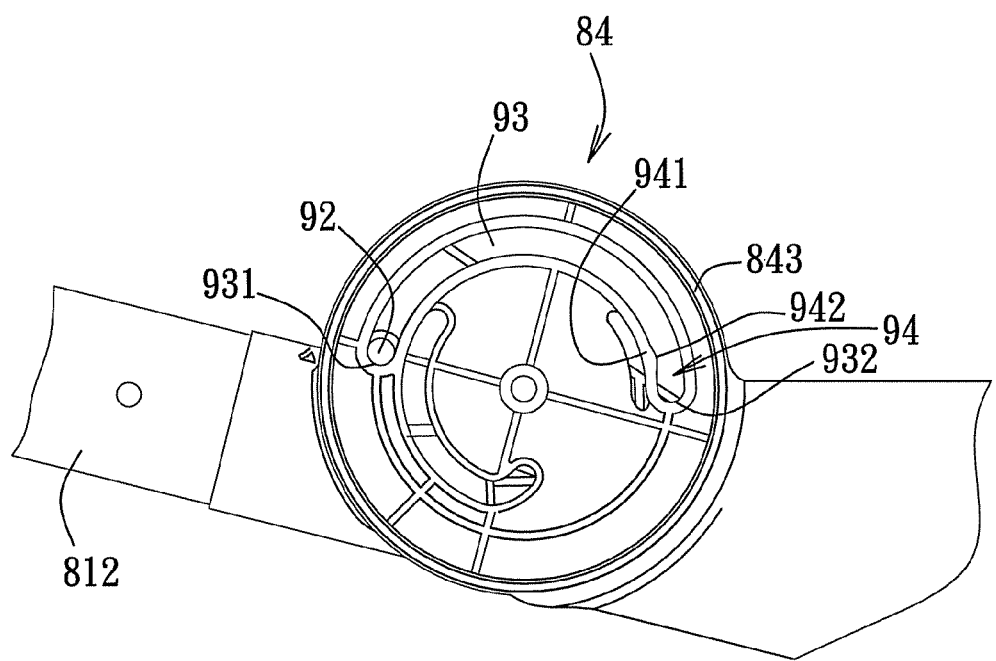
F I G. 15

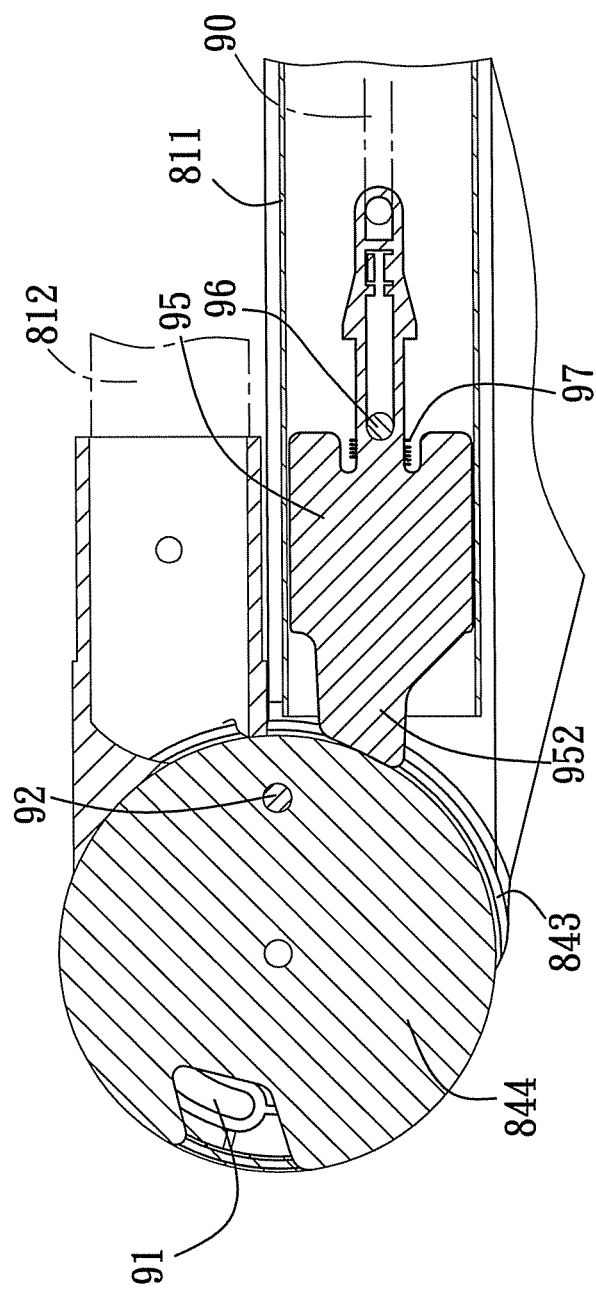
F I G. 16

US 8,444,170 B2

FOLDABLE STROLLER

CROSS-REFERENCE TO RELATED APPLICATION

This application claims priority of Chinese Application No. 200620136654.8, filed on Sep. 21, 2006 and Chinese Application No. 200720157162.1, filed on Jul. 31, 2007.

BACKGROUND OF THE INVENTION

1. Field of the Invention

This invention relates to a stroller, and more particularly to a foldable stroller.

2. Description of the Related Art

With reference to FIG. 1, a conventional stroller 100 is in an unfolded state. With further reference to FIG. 2, the stroller 100 is converted into a folded state. The stroller 100 includes two front rod units, two rear rods 103, and a plurality of wheels 104.

Each of the front rod units includes an upper rod section 101 and a lower rod section 102. Each of the upper rod sections 101 includes a handle 105 disposed at a top end thereof. Each of the rear rods 103 has a top end connected to a bottom end portion of the corresponding upper rod sections 101. The wheels 104 are mounted respectively on bottom ends of the lower rod sections 102 and the rear rods 103. When the stroller 100 is unfolded, the front rod units form an angle with respect to the rear rods 103, and the wheels 104 are disposed on the ground surface. When it is desired to fold the stroller 100, each of the upper rod sections 101 is pivoted about a bottom end pivot point thereof to abut against a rear side of the corresponding rear rod 103. Hence, the lower rod sections 102 and the wheels 104 on the lower rod sections 102 are lifted as a result of movement of the pivoting movement of the upper rod sections 101, thereby abutting against front sides of the rear rods 103.

SUMMARY OF THE INVENTION

An object of this invention is to provide a foldable stroller, which includes a knuckle for interconnecting pivotally two rods, and a latch mechanism for locking the rods in an unfolded or folded state.

According to an aspect of this invention, there is provided a foldable stroller comprising a foldable frame, a seat disposed on the frame, as well as a plurality of front and rear wheels. The frame includes a pair of rear-leg side rod sections, a pair of front-leg side rod sections, and a pair of back-frame side rod sections. The front and rear wheels are mounted respectively on bottom ends of the front-leg and rear-leg side rod sections. The frame further includes two rear-leg connecting members connected respectively to the back-frame side rod sections, and two knuckles disposed respectively on bottom ends of the back-frame side rod sections. The rear-leg side rod sections are connected respectively and pivotally to the back-frame side sections by the rear-leg connecting members, respectively, such that any two adjacent ones of the back-frame side rod sections, the rear-leg connecting members, the front-leg side rod sections, and the rear-leg side rod sections at one side can be pivoted toward each other, thereby folding the frame.

According to another aspect of this invention, there is provided a foldable stroller comprising a foldable frame. The foldable frame includes a connecting member, a first rod, a second rod connected to the first rod by the connecting member, and a knuckle including a first pivot member disposed on an end of one of the first and second rods, and a second pivot member disposed on the connecting member and connected pivotally to the first pivot member. The first and second pivot members are pivotable relative to each other so as to convert the first and second rods between unfolded and folded states.

BRIEF DESCRIPTION OF THE DRAWINGS

These and other features and advantages of this invention will become apparent in the following detailed description of the preferred embodiments of this invention, with reference to the accompanying drawings, in which:

FIG. 9 is a partly sectional view of the latch mechanism of the first preferred embodiment when the stroller is in the folded state;

FIG. 10 is an exploded perspective view of a latch mechanism of the second preferred embodiment of a foldable stroller according to this invention;

FIG. 15 is a schematic side view of the knuckle of the third preferred embodiment when the stroller is in the unfolded state;

FIG. 16 is a sectional view of the knuckle of the third preferred embodiment when the stroller is in the folded state.

DETAILED DESCRIPTION OF THE PREFERRED EMBODIMENTS

Figure 1:
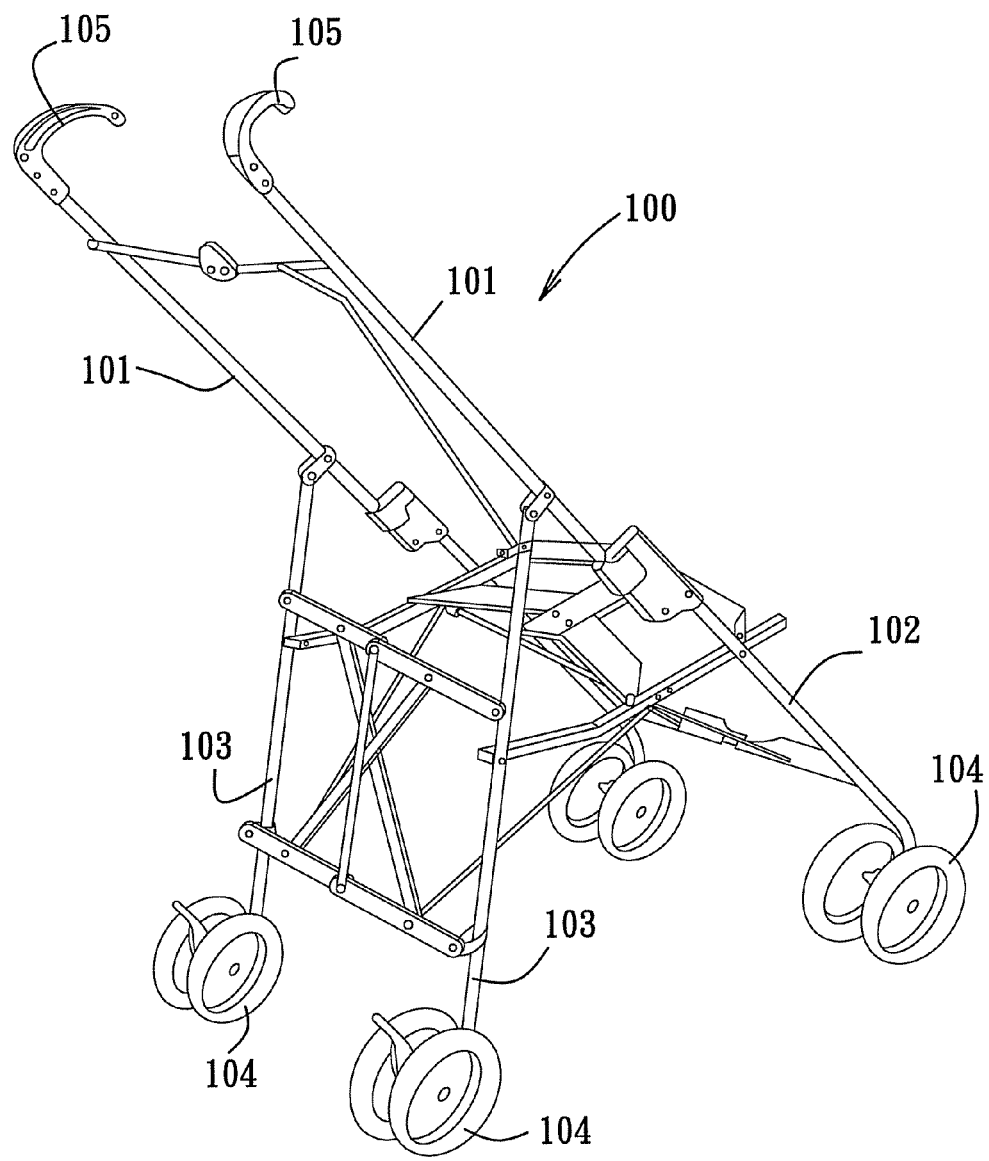
FIG. 1 is a perspective view of a conventional stroller.
Figure 2:
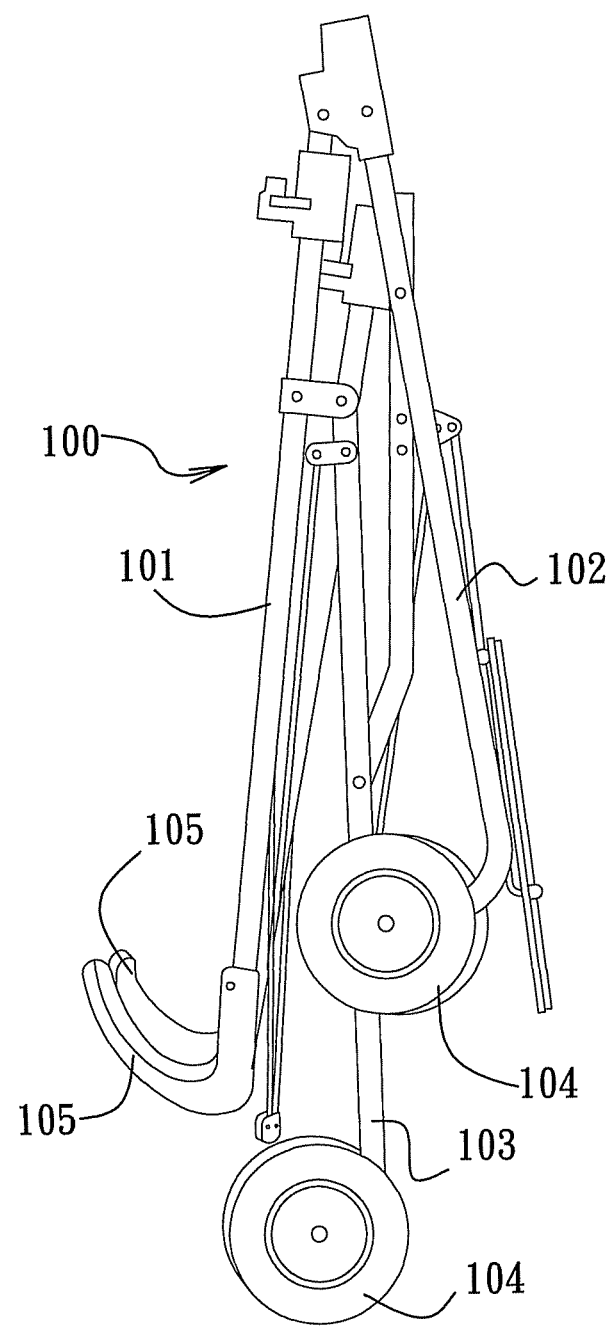
FIG. 2 is a side view of the conventional stroller in a folded state.

Before the present invention is described in greater detail in connection with the preferred embodiments, it should be noted that similar elements and structures are designated by like reference numerals throughout the entire disclosure.

Figure 3:
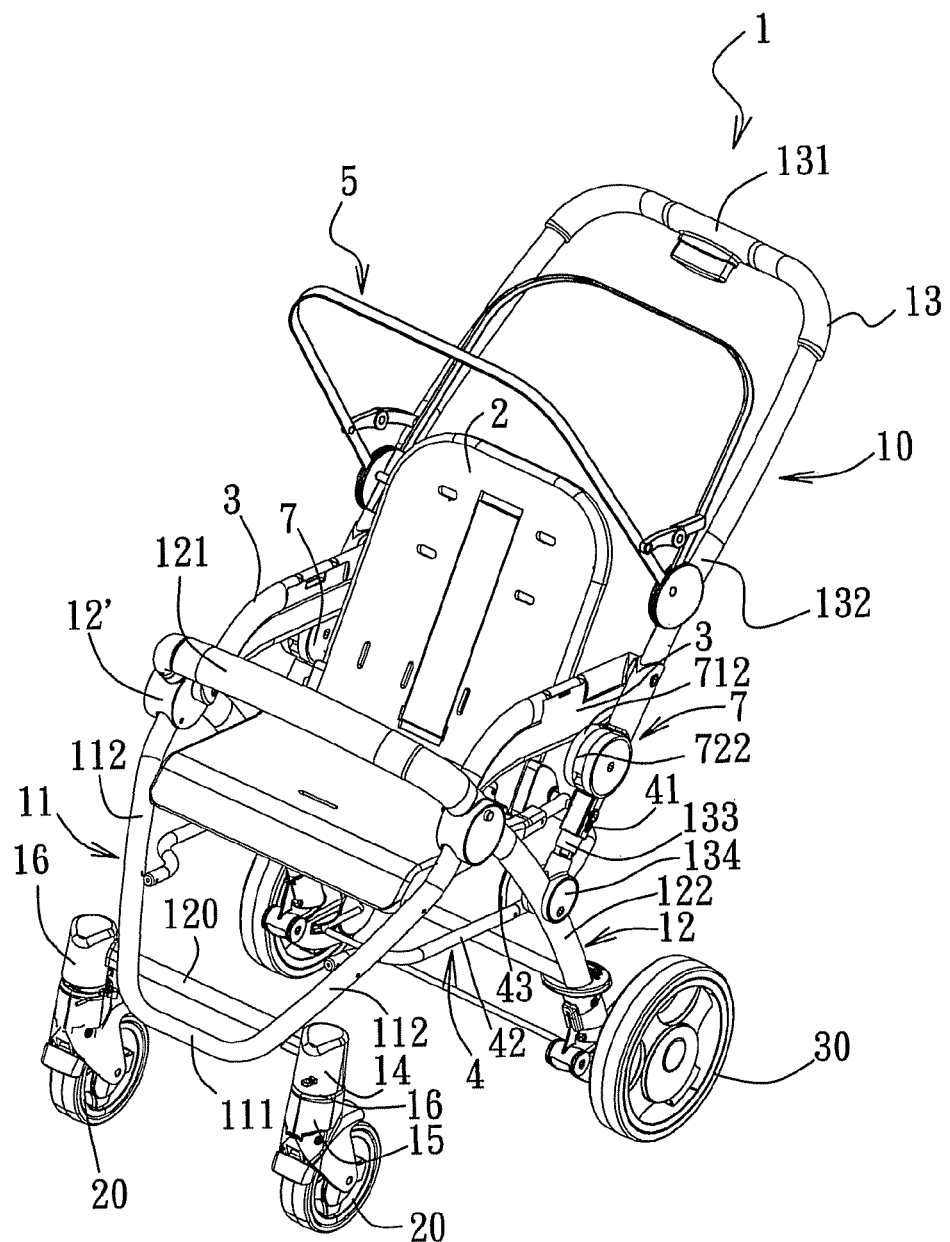
FIG. 3 is a perspective view of the first preferred embodiment of a foldable stroller according to this invention.
Figure 4:
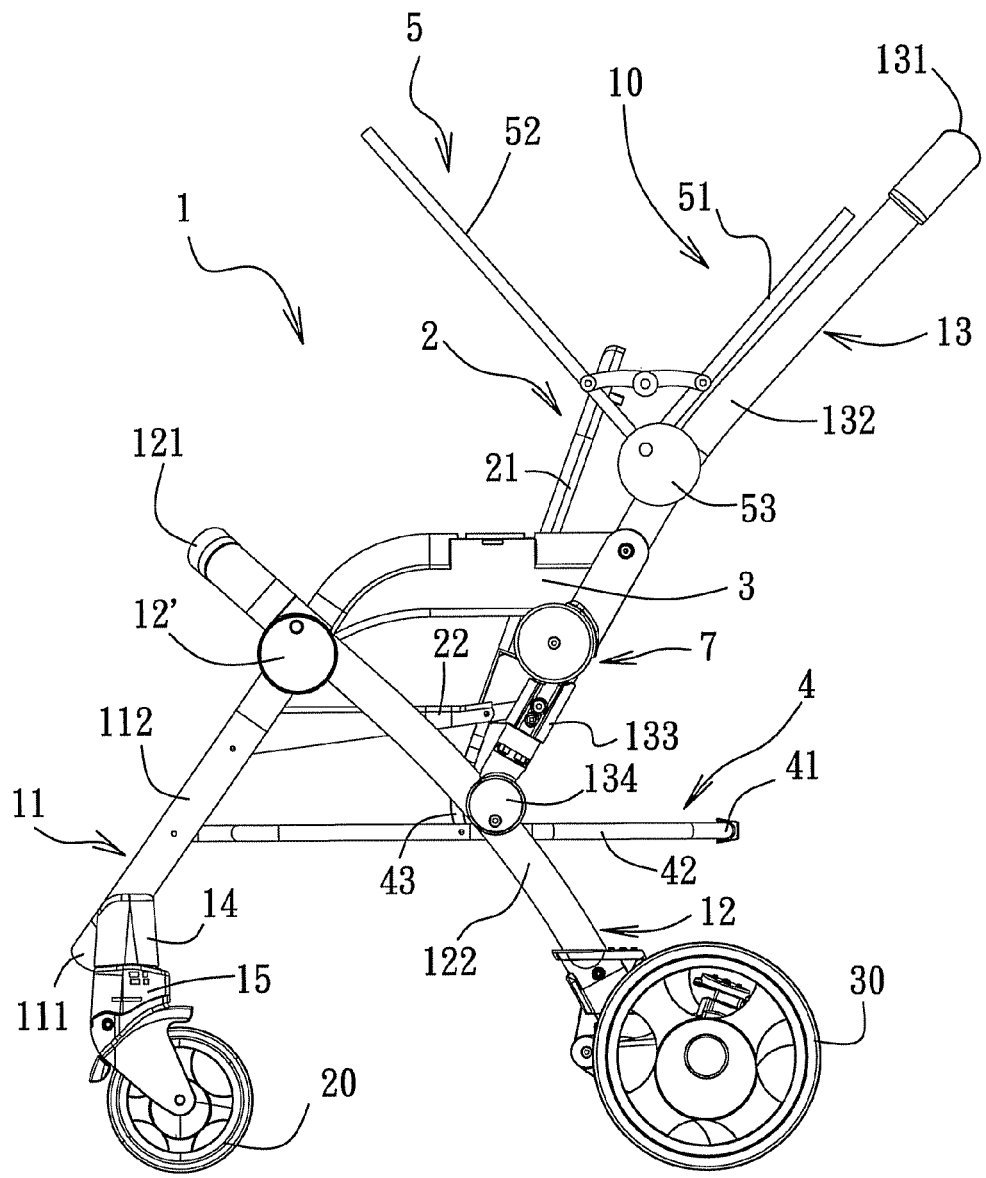
FIG. 4 is a side view of the first preferred embodiment in an unfolded state.
Figure 5:
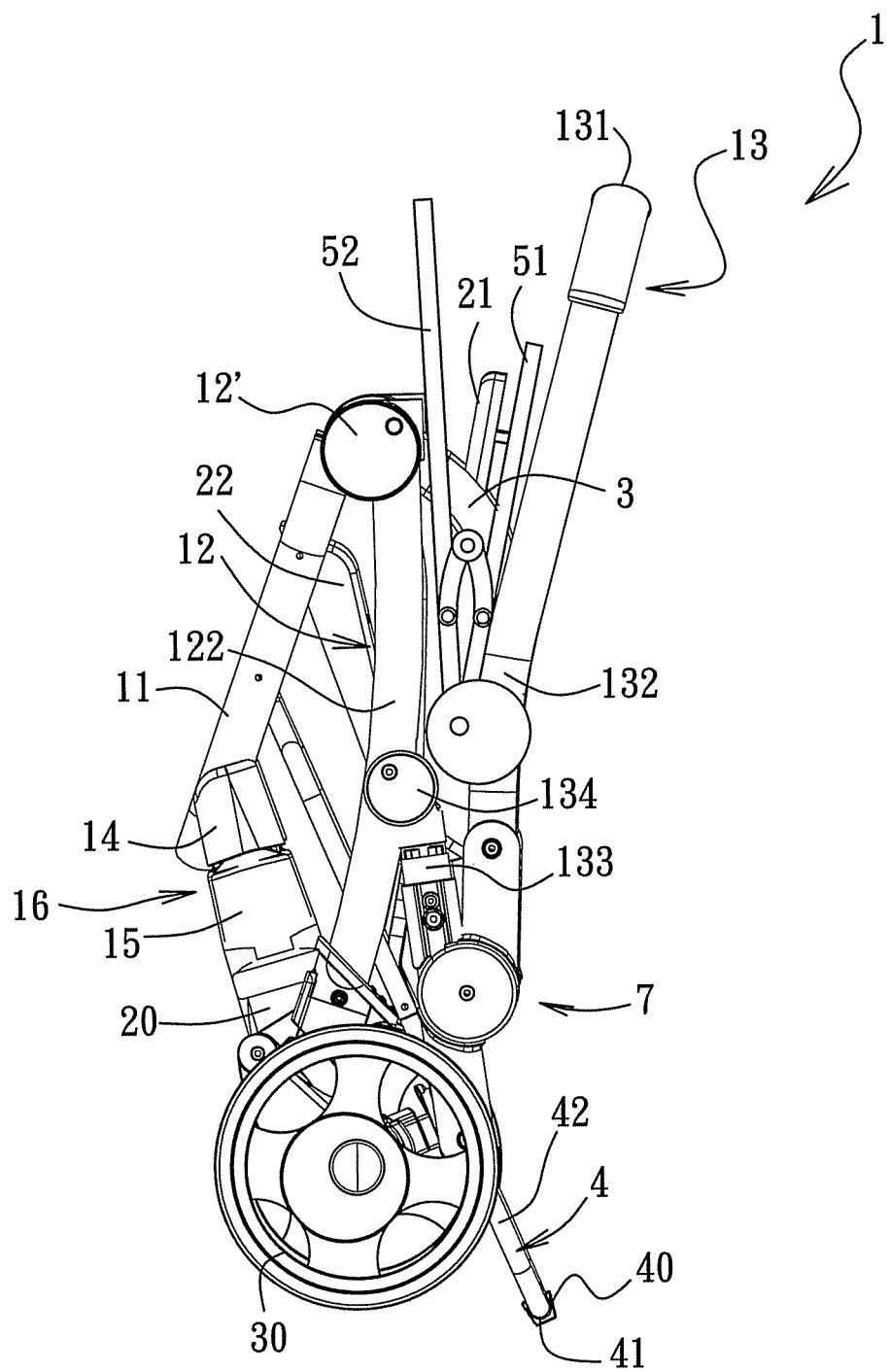
FIG. 5 is a side view of the first preferred embodiment in a folded state.

Referring to FIGS. 3, 4, and 5, the first preferred embodiment of a foldable stroller 1 according to this invention includes a frame 10, a seat 2, a pair of front wheels 20, a pair of rear wheels 30, and two links 43 (only one is shown). The frame 10 includes a front leg 11, a rear leg 12, a back frame 13, two side armrests 3, a rack 4, a bottom rod 120, and a canopy frame 5, which are interconnected such that the stroller 1 and the frame 10 are convertible between an unfolded state shown in FIG. 4 and a folded state shown in FIG. 5.

The front leg 11 is generally U-shaped, and includes a front-leg horizontal rod section 111 and two front-leg side sections 112 connected respectively to two ends of the front-leg horizontal rod section 111. The bottom rod 120 is connected fixedly to the front-leg side rod sections 112, and is parallel and adjacent to the front-leg horizontal rod section 111. The front wheels 20 are mounted respectively on two ends of the bottom rod 120 by two automatic steering mechanisms 16, respectively. The functions of the automatic steering mechanisms 16 will be described hereinafter.

The rear leg 12 is connected pivotally to the front leg 11 by a pivot member 12', and includes two rear-leg side rod sections 122 inclined forwardly and upwardly. Two rear wheels 30 are mounted respectively on bottom ends of the rear-leg side rod sections 122. A protective rail 121 is connected between the rear-leg side rod sections 122. A food tray (not shown) is connected fixedly to the protective rail 121. The protective rail 121 may be connected removably to the rear-leg side rod sections 122 to thereby allow for removal of the protective rail 121 so that a baby may be placed conveniently into the stroller 1.

The back frame 13 is inverted U-shaped, and includes a back-frame horizontal rod section 131 and two back-frame side rod sections 132 connected respectively to two ends of the back-frame horizontal rod section 131. Each of the back-frame side rod sections 132 has a bottom end connected to a rear-leg connecting member 133 by a knuckle 7. The rear-leg connecting members 133 are configured as rods. As such, each of the back-frame side rod sections 132 is pivotable relative to the corresponding rear-leg connecting member 133. Each of the rear-leg connecting members 133 includes a rear-leg connecting seat 134 disposed at a bottom end thereof and connected pivotally to the corresponding rear-leg side rod sections 122. As such, the back frame 13 is pivotable relative to the rear-leg side rod sections 122. The detailed structure of the knuckles 7 will be described hereinafter.

The side armrests 3 have front ends connected respectively and pivotally to the rear-leg side rod sections 122, and rear ends connected respectively and pivotally to the back-frame side rod sections 132.

The seat 2 is disposed on the frame 10, and includes a bottom plate 22 and a back plate 21. The back plate 21 has a bottom end connected pivotally to a rear end of the bottom plate 22. The bottom plate 22 has two opposite sides connected respectively and pivotally to the rear-leg connecting members 133.

The rack 4 is disposed on the front and rear legs 11, 12, and includes a transverse rod section 41 and two longitudinal rod sections 42 extending respectively and forwardly from two ends of the transverse rod section 41 to form a U-shaped frame. The longitudinal rod sections 42 have front ends connected respectively and pivotally to the front-leg side rod sections 112 at positions under the bottom plates 22, and rear ends disposed behind the rear leg 12 and directly above the rear wheels 30, respectively. The links 43 have upper ends connected respectively and pivotally to the bottom plate 22, and lower ends connected respectively and pivotally to the longitudinal rod sections 42. As such, when the frame 10 is folded, the pivoting movement of the rack 4 and the seat 2 relative to the remaining members of the frame 10 is allowed. In this embodiment, the rack 4 is configured as a basket frame for connection with a basket.

The canopy frame 5 includes two inverted U-shaped first and second canopy-supporting rods 51, 52 interconnected by a hinge unit 53 and disposed pivotally on an assembly of the back-frame side rod sections 132 at positions above the side armrests 3.

With particular reference to FIG. 4, when the stroller 1 is in the unfolded state, each of the front leg 11 and the back frame 13 forms an angle with respect to the rear leg 12, and the rack 4 is disposed horizontally between the seat 2 and an assembly of the front and rear wheels 20, 30. Further, the first canopy-supporting rod 51 is generally parallel to the back frame 13, and the second canopy-supporting rod 52 forms an angle with respect to the first canopy-supporting rod 51. In this state, a canopy (not shown) can be supported by the first and second canopy-supporting rods 51, 52. When the canopy is not used, the second canopy-supporting rod 52 is pivoted toward the first canopy-supporting rod 51 so as to abut against the same.

Figure 6:
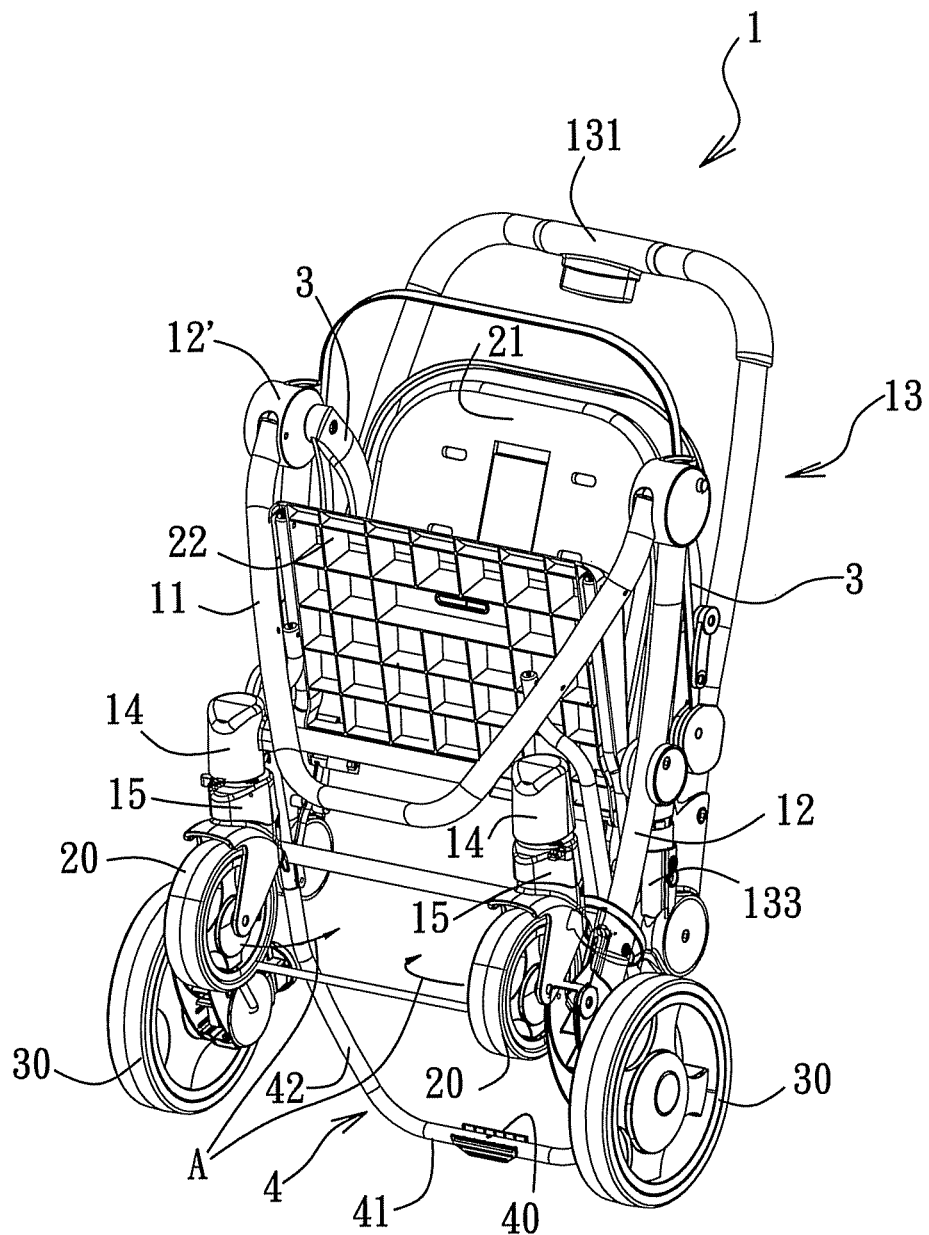
FIG. 6 is a perspective view of the first preferred embodiment in the folded state.

With particular reference to FIGS. 5 and 6, to fold the stroller 1, the front leg 11 is pivoted toward the rear leg 12. Since the distance between a bottom end of the front leg 11 and the pivot member 12' is shorter than that between a bottom end of the rear leg 12 and the pivot member 12', when the front leg 11 is pivoted toward the rear leg 12, the front wheels 20 are lifted away from the ground surface. Hence, lower portions 15 of the automatic steering mechanisms 16 are separated from upper portions 14 of the automatic steering mechanisms 16 in a downward direction and by a predetermined amount by virtue of gravity, thereby allowing for rotation of the lower portions 15 relative to upper portions 14. As a result, when the stroller 1 is in the folded state, if necessary, the front wheels 20 may be pivoted in directions shown by the arrows (A) in shown in FIG. 6 until a side surface of each of the front wheels 20 faces forwardly (i.e., the horizontal rotating axes of the front wheels 20 are perpendicular to those of the rear wheels 30) to thereby reduce the width of the stroller 1 in a front-to-rear direction.

Since the automatic steering mechanisms 16 do not pertain to this invention, a further description thereof will be omitted herein for the sake of brevity.

Figure 7:
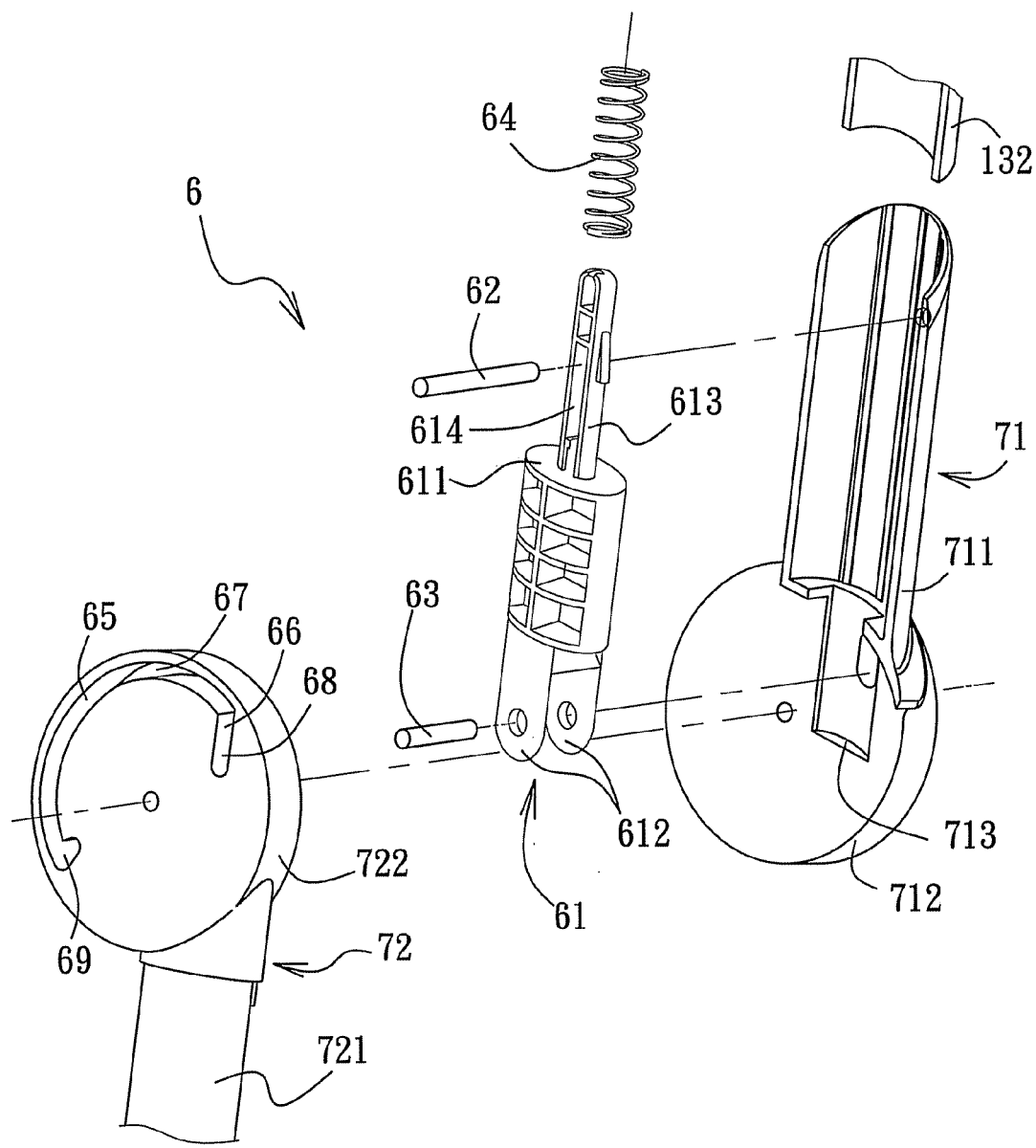
FIG. 7 is an exploded perspective view of a latch mechanism of the first preferred embodiment.
Figure 8:
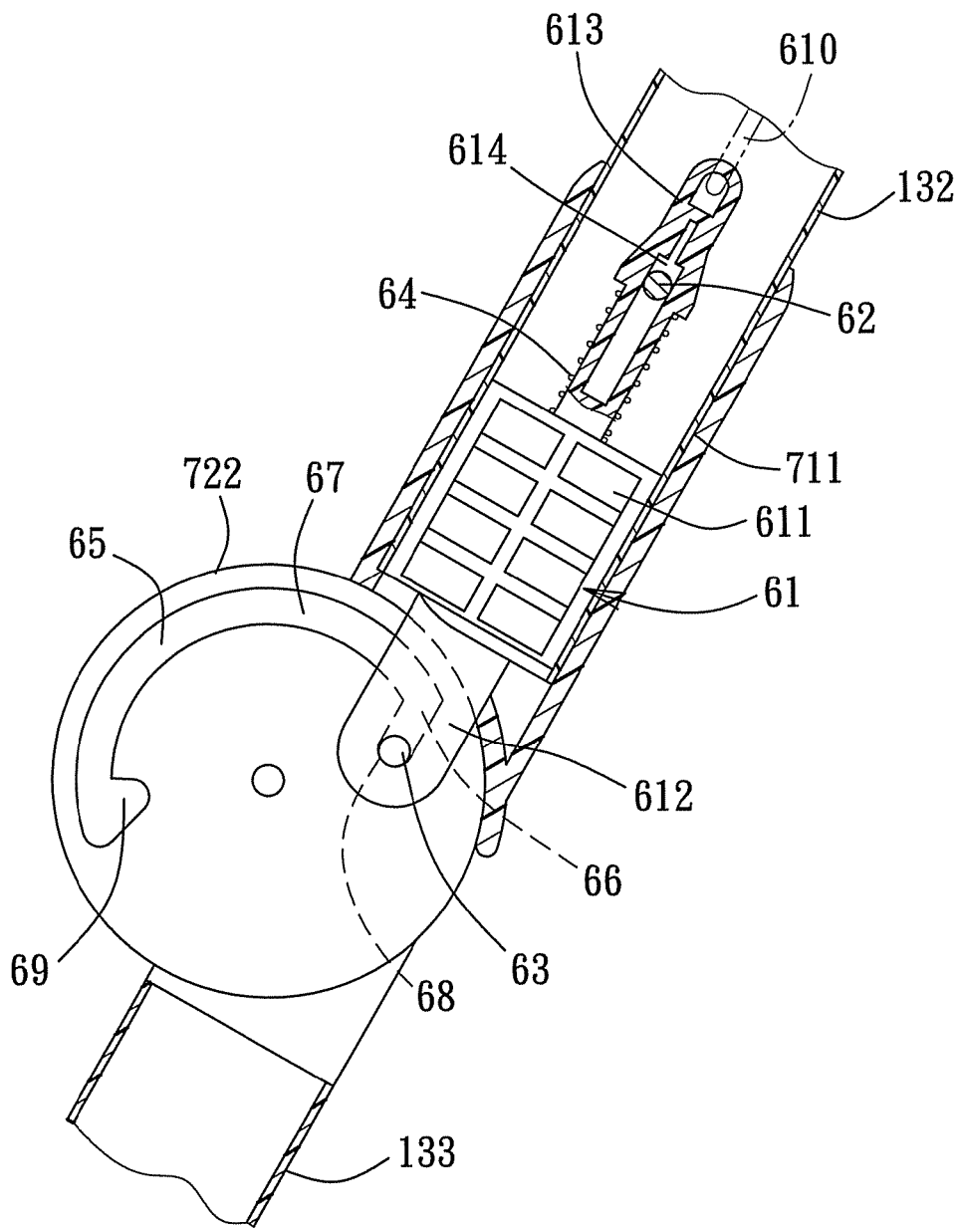
FIG. 8 is a partly sectional view of the latch mechanism of the first preferred embodiment when the stroller is in the unfolded state.

With further reference to FIGS. 7, 8, and 9, each of the knuckles 7 includes a first pivot seat 71 and a second pivot seat 72 that have a circular first pivot member 712 and a circular second pivot member 722, respectively. Each of the first pivot members 712 includes two spaced-apart parallel circular side plates. Each of the second pivot members 722 is configured as a circular plate, and is disposed between the circular side plates of the corresponding first pivot member 712. Each of upper ends of the first pivot members 712 is formed with an upper tube portion 711 connected to the corresponding back-frame side rod section 132. Each of lower ends of the second pivot members 722 is formed with a lower tube portion 721 connected to a top end of the corresponding rear-leg connecting member 133.

The first and second pivot members 712, 722 of each of the knuckles 7 are locked relative to each other by a latch mechanism 6 when the stroller 1 is in the unfolded or folded state. To unfold or fold the stroller 1, it is necessary to unlock each of the first pivot members 712 from the corresponding second pivot member 722 in advance. With particular reference to FIG. 7, each of the latch mechanisms 6 includes a locking member 61, a guide pin 62, a compression spring 64, and a slide slot 65 formed in the corresponding second pivot member 722. Each of the slide slots 65 has a longitudinal slot portion 66 extending along a longitudinal direction of the corresponding back-frame side rod section 132, and a circumferential slot portion 67 extending from an upper end of the longitudinal slot portion 66 along a circumferential direction of the corresponding second pivot member 722. Each of the longitudinal slot portions 66 has a first positioning portion 68 disposed at a lower end thereof. Each of the circumferential slot portions 67 has a barb-shaped second positioning portion 69 disposed at an end thereof distal from the corresponding longitudinal slot portion 66.

Each of the locking members 61 has a body 611 disposed movably within the corresponding upper tube portion 711, and a positioning pin 63 connected fixedly to the body 611. Each of the bodies 611 is formed with two parallel lugs 612 extending downwardly therefrom and flanking the corresponding second pivot member 722. In this embodiment, each of the circular side plates of each of the first pivot members 712 is formed with a recess 713 for receiving the lugs 612 of the corresponding locking member 61. Each of the locking members 61 further includes a rod portion 613 extending upwardly from the corresponding body 611 and formed with a guide slot 614 extending in a longitudinal direction thereof and having two closed ends. Each of the guide pins 62 extends through the guide slot 614 in the rod portion 613 of the corresponding locking member 61, and is disposed fixedly in the corresponding back-frame side rod section 132. As such, each of the locking members 61 is movable within the corresponding upper tube portion 711 along the longitudinal direction until either of the closed ends of the corresponding guide slot 614 engages the corresponding guide pin 62. Each of the compression springs 64 is sleeved on the rod portion 613 of the corresponding locking member 61 between the corresponding body 611 and the corresponding guide pin 62. As such, each of the locking members 61 is biased to project from the bottom end of the corresponding back-frame side rod sections 132 to allow for movement of the corresponding positioning pin 63 within the corresponding slide slot 65 and, thus, relative rotation of the corresponding first and second pivot members 712, 722.

With particular reference to FIGS. 4 and 8, when the stroller 1 is unfolded, each of the positioning pins 63 is biased by the corresponding compression spring 64 to engage the first positioning portion 68 of the corresponding slide slot 65, thereby locking each of the back-frame side rod sections 132 and the corresponding rear-leg connecting member 133 in an unfolded state shown in FIG. 8. Hence, the stroller is maintained in the unfolded state. When it is desired to fold the stroller 1, in each of the latch mechanisms 6, a pull cable 610 is operable to pull the locking member 61 upwardly to thereby move the positioning pin 63 from the first positioning portion 68 into the upper end of the longitudinal slot portion 66. In this state, the positioning pin 63 is movable along the circumferential slot portion 67. Hence, the first and second pivot members 712, 722 are rotatable relative to each other. Further, the back-frame side rod sections 132 are pivotable and foldable relative to the rear-leg connecting members 133, respectively. As a result, the stroller 1 can be folded. When the stroller 1 is converted into the folded state shown in FIG. 5, the positioning pins 63 engage respectively the second positioning portions 69 to lock each of the back-frame side rod sections 132 and the corresponding rear-leg connecting member 133 in a folded state shown in FIG. 9. With particular reference to FIGS. 5 and 6, when folded, the stroller 1 can be maintained in a vertical state in such a manner that the rear wheels 30 and the transverse rod section 41 of the rack 4 are in contact with the ground surface. A cushion member 40 may be sleeved on the transverse rod section 41 to maintain the stroller 1 stably in the vertical folded state.

As such, the stroller 1 can be locked in the unfolded or folded state by the latch mechanisms 6 in such a manner to prevent relative rotation of the first and second pivot members 712, 722 of each of the knuckles 6. To change the state of the stroller 1, the first and second pivot members 712, 722 must be unlocked from each other prior to conversion between the unfolded and folded states of the corresponding back-frame side rod section 132 and the rear-leg connecting member 133.

Figure 11:
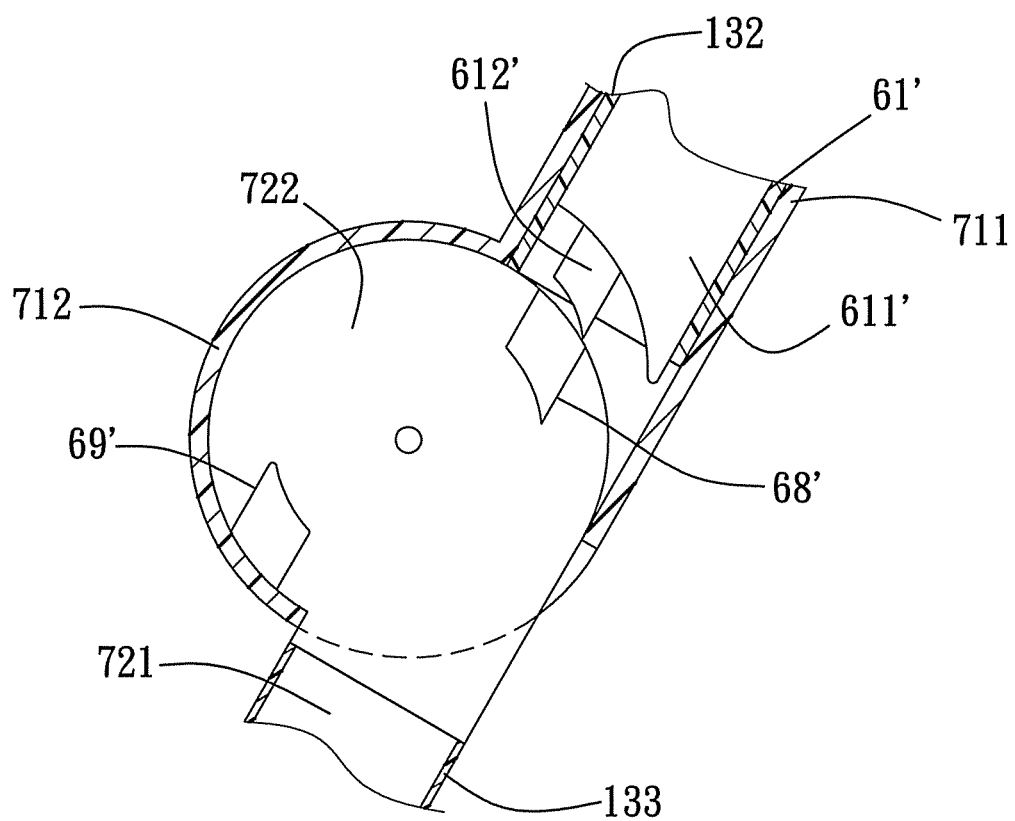
FIG. 11 is a partly sectional view of the latch mechanism of the second preferred embodiment when the stroller is in an unfolded state.

FIGS. 10 and 11 show a latch mechanism 6' of the second preferred embodiment of a folded stroller according to this invention. The latch mechanism 6' is similar in construction to that of the first preferred embodiment. In this embodiment, the slide slot 65 (see FIG. 7) is omitted from the second pivot member 722, and is replaced with first and second positioning grooves 68', 69', which are formed in a periphery of the second pivot member 722. In addition, the locking member 61' has a body 611' and a projection 612' extending downwardly from the body 611' and biased to engage a selected one of the first and second positioning grooves 68', 69', thereby locking the stroller in a selected one of the unfolded and folded states.

With reference to FIGS. 12, 13, 14, and 15, the third preferred embodiment of a foldable stroller according to this invention includes a frame 8, a seat 82, and a plurality of front and rear wheels 83.

The frame 8 includes left and right frame bodies 81 disposed respectively at two opposite sides thereof. The seat 82 is disposed between the left and right frame bodies 81. Each of the left and right frame bodies 81 includes a back-frame side rod section 811, a front-leg side rod section 812, a rear-leg side rod section 813, a bottom rod 814, a rear-leg connecting member 91, a knuckle 84, and a latch mechanism 9 (see FIG. 14). Each of the back-frame side rod sections 811 has a bottom end received within a receiving tube portion 911 of the corresponding rear-leg connecting member 91. The back-frame side rod sections 811 have upper ends interconnected by a horizontal rod section 815 (see FIG. 12) to constitute a back frame. The rear-leg connecting member 91 further includes a rear-leg connecting portion 912 connected pivotally to the corresponding rear-leg side rod section 813.

One of the left and right frame bodies 81 will be described in the succeeding paragraphs.

The knuckle 84 includes a first pivot seat 841 disposed on both a bottom end of the receiving tube portion 911 of the rear-leg connecting member 91 and the bottom end of the back-frame side rod section 811, and a second pivot seat 842 disposed on a top end of the front-leg side rod section 812. The first pivot seat 841 includes a first pivot member 843 including two spaced-apart parallel circular side plates. The second pivot seat 842 includes a second pivot member 844 configured as a circular plate and disposed pivotally between the circular side plates of the first pivot members 843. As such, the front-leg side rod section 812 is connected pivotally to the back-frame side rod section 811 by the knuckle 84. The rear-leg side rod section 813 has a top end connected pivotally to the rear-leg connecting portion 912. The bottom rod 814 is connected pivotally between the front-leg side rod section 812 and the rear-leg side rod section 813. Due to the presence of the knuckle 84 and the rear-leg connecting member 91, any two adjacent ones of the back-frame side rod section 811, the front-leg side rod section 812, and the rear-leg side rod section 813 at one side are pivotable relative to each other. Hence, the stroller body 81 can be converted between an unfolded state shown in FIG. 12 and a folded state shown in FIG. 13.

The latch mechanism 9 includes a positioning groove 91' formed in the second pivot member 844, a sliding rod 92 disposed on the second pivot member 844, a curved slide slot 93 formed in one of the side plates of the first pivot member 843, and a position-limiting portion 94. The slide slot 93 extends along a circumferential direction of the first pivot member 843 by an angle of about 180 degrees, and has opposite first and second ends 931, 932. The extension angle of the slide slot 93 may be changed according to a desired angle formed between the back-frame side rod section 811 and the front-leg side rod section 812. The sliding rod 92 is movable within the slide slot 93 unless it is locked at the second end 932 of the slide slot 93 by the position-limiting portion 94. The latch mechanism 9 further includes a locking member 95, a guide pin 96, and a compression spring 97, which are disposed within a bottom end portion of the back-frame side rod section 811.

The position-limiting portion 94 includes a resilient wall 941 defining the slide slot 93, and a projection 942 extending from the resilient wall 941 into the slide slot 93.

The locking member 95 includes a body 951 disposed in the back-frame side rod section 811, a projection 952 extending downwardly from the body 951 and biased to project from the bottom end of the back-frame side rod section 811, and a rod portion 953 extending upwardly from the body 951. The rod portion 953 has a dome-shaped top end 954, and is formed with a guide slot 955 extending along a longitudinal direction thereof. The guide pin 96 is disposed fixedly on and perpendicular to the back-frame side rod section 811. The compression spring 97 is sleeved on the rod portion 953 between the guide pin 96 and the body 951. An actuating mechanism (not shown) is disposed on the horizontal rod portion 815, and is connected to the top end of the rod portion 953 by a pull cable 90. The actuating mechanism is operable to move the pull cable 90 and, thus, the locking member 95 upwardly to retract the projection 952 into the back-frame side rod section 811, as shown in FIG. 16.

Figure 12:
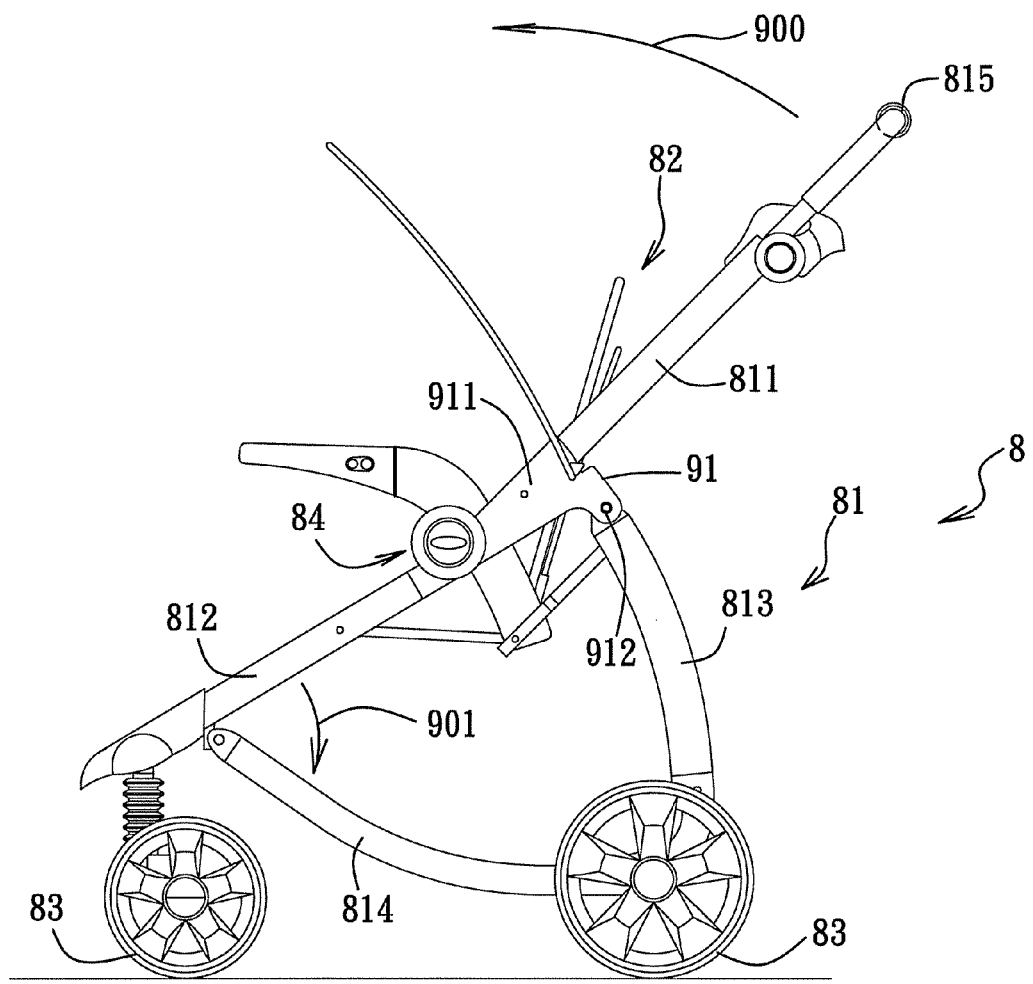
FIG. 12 is a side view of the third preferred embodiment of a foldable stroller according to this invention in an unfolded state.
Figure 13:
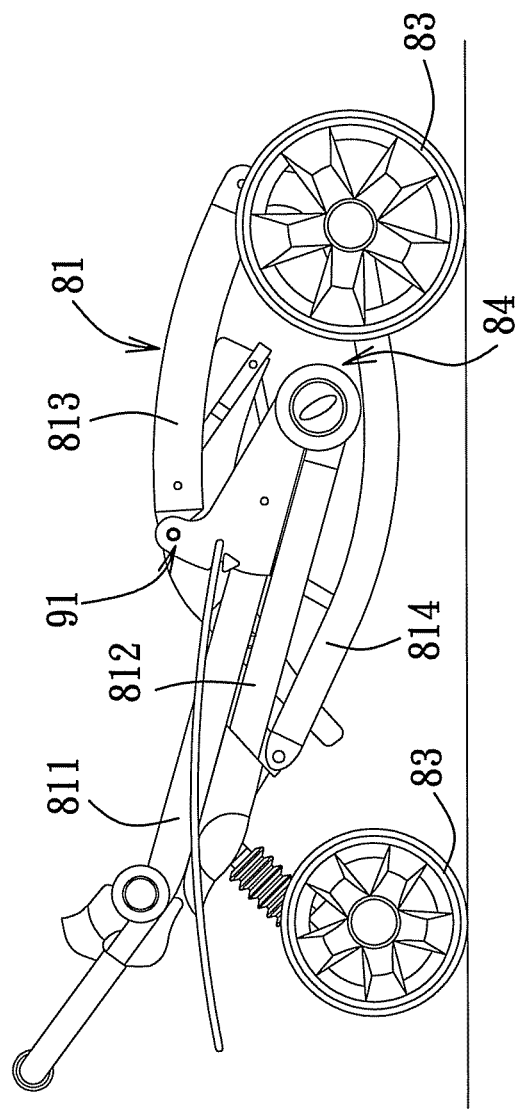
FIG. 13 is a side view of the third preferred embodiment in a folded state.
Figure 14:
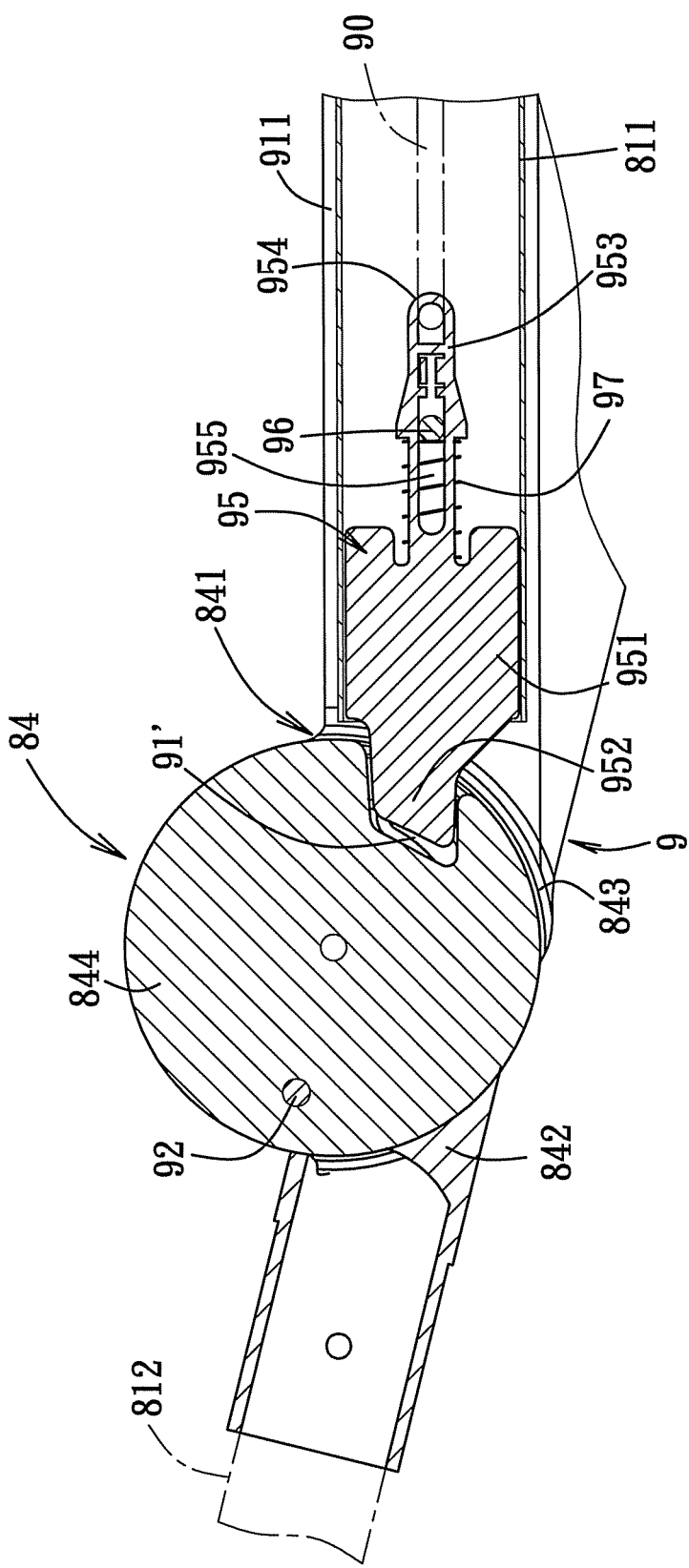
FIG. 14 is a sectional view of a knuckle of the third preferred embodiment when the stroller is in the unfolded state.

With particular reference to FIG. 12, when the frame body 81 is unfolded, the back-frame side rod section 811 is generally aligned with the front-leg side rod section 812, and the projection 952 engages the positioning groove 91' to lock the back-frame rod section 811 relative to the front-leg side rod section 812. In this state, the sliding rod 92 is disposed in the first end 931.

Figure 17:
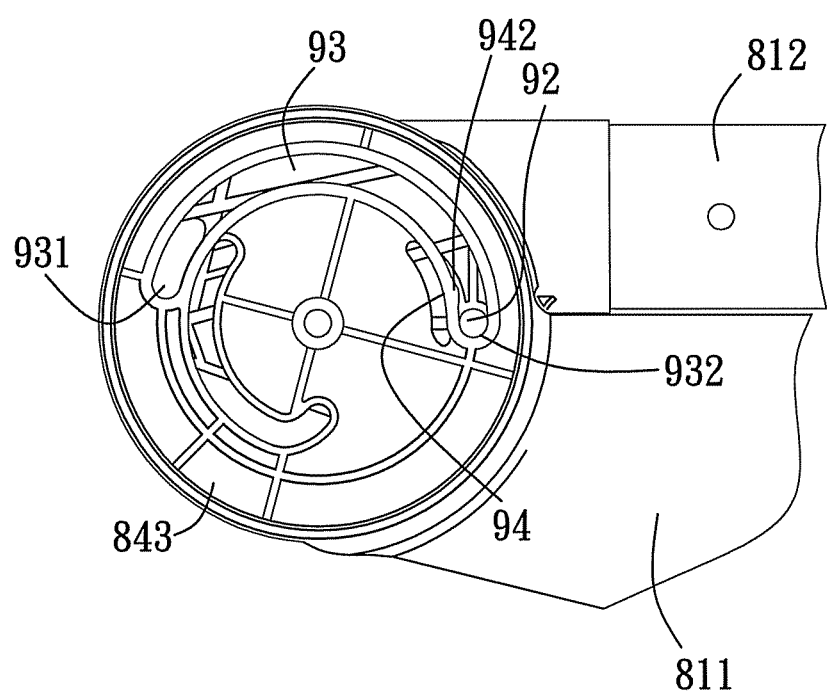
FIG. 17 is a schematic side view of the knuckle of the third preferred embodiment when the stroller is in the folded state.

When it is desired to fold the frame body 81, the actuating mechanism is operated to remove the projection 952 from the positioning groove 91' to thereby unlock the back-frame side rod section 811 from the front-leg side rod section 812. Next, the back-frame side rod section 811 and the front-leg side rod section 812 are pivoted toward each other. Further, the back-frame side rod section 811 is pivoted toward the front-leg side rod section 812 in a direction shown by the arrow 900 in FIG. 12, and the front-leg side rod section 812 is pivoted toward the bottom rod 814 in a direction shown by the arrow 901 in FIG. 12. Hence, the frame body 81 is converted into a folded state shown in FIG. 13. In this state, with particular reference to FIG. 17, the sliding rod 92 is confined between the projection 942 and a wall of the first pivot member 843 defining the second end 932 of the slide slot 93 to lock the back-frame side rod section 811 and the front-leg side rod section 812 in a folded state.

Subsequently, a force can be applied to pivot the back-frame side rod section 811 away from the front-leg side rod section 812 such that the sliding rod 92 is forcibly passed over the projection 942. As a consequence, the frame body 81 can be returned to the unfolded state shown in FIG. 12.

In view of the above, the foldable stroller of this invention has the following advantages:
(1) When the stroller 1 is folded, major portions of the back-frame side rod sections 132, 811 overlap the rear-leg side rod sections 122 or the front-leg side rod sections 812. Thus, the volume of the folded stroller 1 can be reduced effectively.
(2) The stroller can be locked at the unfolded or folded state.

With this invention thus explained, it is apparent that numerous modifications and variations can be made without departing from the scope and spirit of this invention. It is therefore intended that this invention be limited only as indicated by the appended claims.

We claim:

1. A foldable stroller comprising a foldable frame, a seat disposed on said frame, as well as a plurality of front and rear wheels, said frame including a pair of rear-leg side rod sections, a pair of front-leg side rod sections, and a pair of back-frame side rod sections, said front and rear wheels being mounted respectively on bottom ends of said front-leg and rear-leg side rod sections, wherein said frame further includes two rear-leg connecting members connected respectively to said back-frame side rod sections, and two knuckles disposed respectively on bottom ends of said back-frame side rod sections, said rear-leg side rod sections being connected respectively and pivotally to said back-frame side sections by said rear-leg connecting members, respectively, such that any two adjacent ones of said back-frame side rod sections, said front-leg side rod sections, and said rear-leg side rod sections at one side can be pivoted toward each other, thereby folding said frame wherein each of said knuckles includes a first pivot member connected fixedly to said bottom end of a corresponding one of said back-frame side rod sections, and a second pivot member connected to a corresponding one of said front-leg side rod sections and connected pivotally to the first pivot member, wherein said first pivot member of each of said knuckles has a curved slide slot, said curved slide slot having two opposite closed first and second ends, and said second pivot member of each of said knuckles being provided with a sliding rod received movably within said slide slot such that, when said sliding rod is disposed within said first end of said slide slot, said frame is in an unfolded state, and when said sliding rod is disposed within said second end of said slide slot, said frame is locked in a folded state;

wherein said frame further includes a pair of bottom rods each having a front end connected pivotally to a corresponding one of said front-leg side rod sections at a position adjacent to said bottom end of the corresponding one of said front-leg side rod sections, and a rear end connected pivotally to said bottom end of a corresponding one of said rear-leg side rod sections at a corresponding one of said rear wheels, such that, when said frame is folded, said back-frame side rod sections abut respectively against said front-leg side rod sections, and an assembly of said back-frame side rod sections and said front-leg side rod sections is disposed between said rear-leg side rod sections and said bottom rods; and wherein the rear-leg side rod sections and the bottom rods are each curved, such that the respective peak of the curvature of curve of the rear-leg side rod sections each correspondingly face away from the front wheels, and such that the respective peak of the curvature of curve of the bottom rods each correspondingly face away from the rear-leg connecting members, and such that the front end of each of the bottom rods respectively extend vertically higher relative to a horizontal support surface on which the foldable stroller supported on during use than the respective highest vertical point on each of the rear wheels; and wherein the rear wheels are larger in size than the front wheels.

2. The foldable stroller as claimed in claim 1, wherein each of said first pivot members has a position-limiting portion that includes a resilient wall defining a corresponding one of said slide slots in said first pivot members, and a projection extending from said resilient wall into said corresponding one of said slide slots for confining a corresponding one of said sliding rods of said second pivot members between said projection and a wall of a corresponding one of said first pivot members defining said second end of said corresponding one of said slide slots.

3. The foldable stroller as claimed in claim 2, wherein each of said first pivot members includes two spaced-apart circular side plates, each of said second pivot members being disposed pivotally between said circular side plates of a corresponding one of said first pivot members, said slide slot and said position-limiting portion of each of said first pivot members being disposed at one of said circular side plates of said corresponding one of said first pivot members.

4. The foldable stroller as claimed in claim 1, wherein each of said second pivot members is disposed on a top end of a corresponding one of said front-leg side rod sections, and is connected to a corresponding one of said rear-leg connecting members by a corresponding one of said first pivot members, whereby, said back-frame side rod sections are foldable relative to said front-leg side rod sections, respectively.

5. The foldable stroller as claimed in claim 4, wherein each of said rear-leg connecting members includes a receiving tube portion sleeved on a corresponding one of said back-frame side rod sections, and a rear-leg connecting portion connected pivotally to said top end of a corresponding one of said rear-leg side rod sections.

6. A foldable stroller comprising
a foldable frame including:
   a pair of rear-leg side rod sections,
   a pair of front-leg side rod sections,
   a pair of back-frame side rod sections,
   two rear-leg connecting members connected to said back-frame side rod sections,
   two knuckles disposed on bottom ends of said back-frame side rod section, wherein each of said knuckles includes:
      a first pivot member, which is connected fixedly to said bottom ends of said back-frame side rod sections, pivotally interconnected to a second pivot member, which is connected to a corresponding one of said front-leg side rod sections,
      wherein each of said first pivot members has a curved slide slot, said curved slide slot having two opposite closed first and second ends, wherein each of said second pivot members each has a sliding rod, and the sliding rod is received movably within said curved slide slot such that, when said sliding rod is disposed within said first end of said curved slide slot, said frame is in an unfolded state, and when said sliding rod is disposed within said second end of said curved slide slot, said frame is locked in a folded state, wherein said curved slide slots each further include a position limiting portion, which includes a resilient wall and a projection associated with said second end of the curved slide slots that extends from said resilient wall into said curved slide slot, for confining a corresponding one of said sliding rods of said second pivot members adjacent to said second end of said curved side slot when said frame is in the folded state, wherein said rear-leg side rod sections are connected respectively and pivotally to said back-frame side sections by said rear-leg connecting members,
a pair of bottom rods each having a front end, which is connected pivotally to a corresponding one of said front-leg side rod sections at a position adjacent to said bottom end of the corresponding one of said front-leg side rod sections, and a rear end, which is connected pivotally to said bottom end of a corresponding one of said rear-leg side rod sections,
wherein said rear-leg side rod sections are pivotally connected to said back-frame side rod sections by said rear-leg connecting members such that any two corresponding adjacent one of said back-frame side rod sections, said bottom rods, said front-leg side rod sections, and said rear-leg side rod sections are pivoted toward one another during folding of the frame,
wherein when said frame is folded, said back-frame side rod sections abut respectively against said front-leg side rod sections, and an assembly of said back-frame side rod sections and said front-leg side rod sections is disposed between said rear-leg side rod sections and said bottom rods;
a pair of front wheels mounted on bottom ends of said front-leg side sections;
a pair of rear wheels mounted on bottom ends of said rear-leg side sections;
a seat disposed on said frame; and
wherein the rear-leg side rod sections and the bottom rods are each curved, such that the respective peak of the curvature of curve of the rear-leg side rod sections each correspondingly face away from the front wheels, and such that the respective peak of the curvature of curve of the bottom rods each correspondingly face away from the rear-leg connecting members, and such that the front end of each of the bottom rods respectively extend vertically higher relative to a horizontal support surface on which the foldable stroller is supported on during use than the respective highest vertical point on each of the rear wheels; and
wherein the rear wheels are larger in size than the front wheels.

\* \* \* \* \*